Feb. 19, 1963 R. C. ELDER, SR 3,077,719
CHAIN AND SLAT TYPE REEL FOR COMBINES
Filed Aug. 23, 1960 3 Sheets-Sheet 1
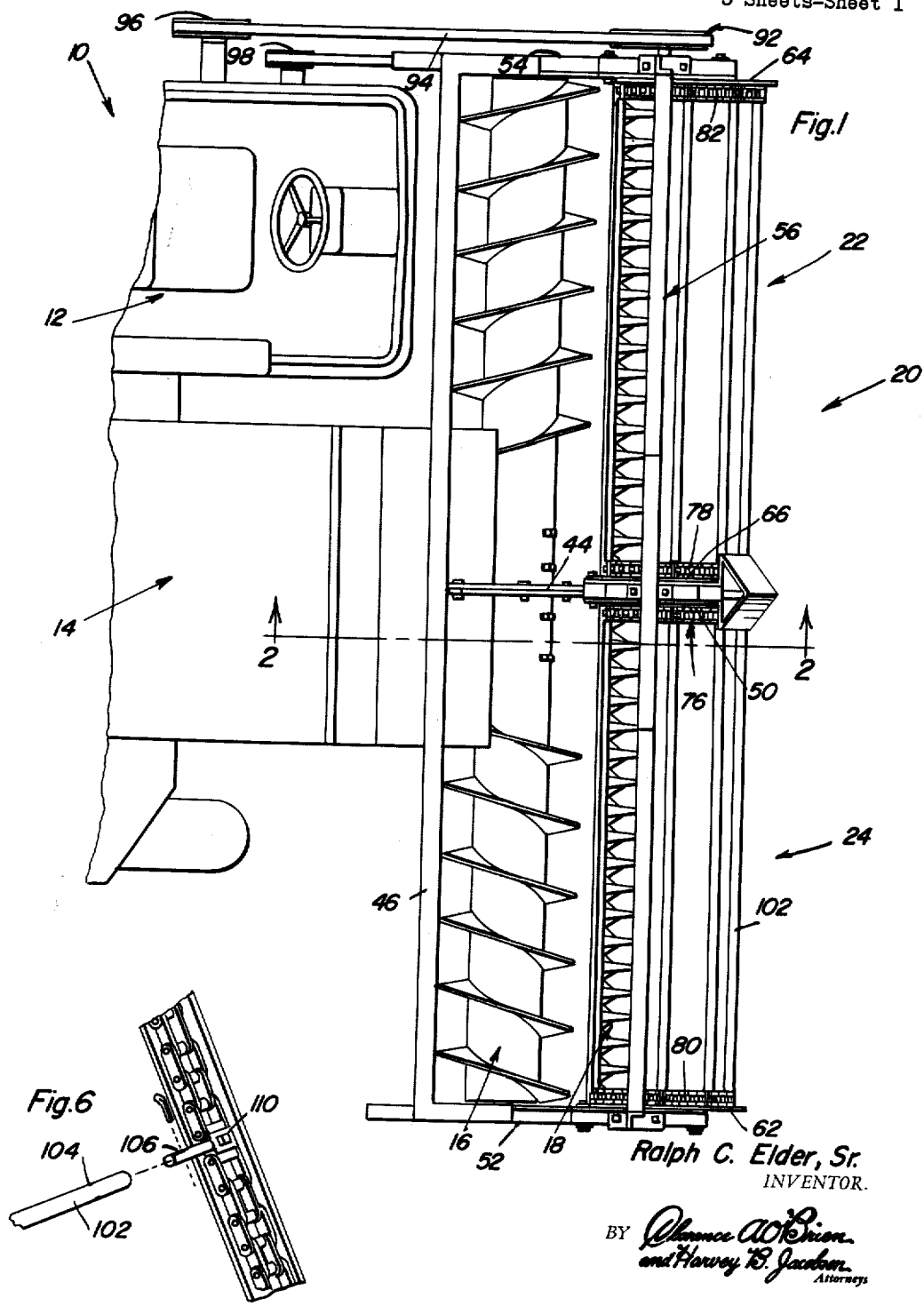
Ralph C. Elder, Sr.
INVENTOR.

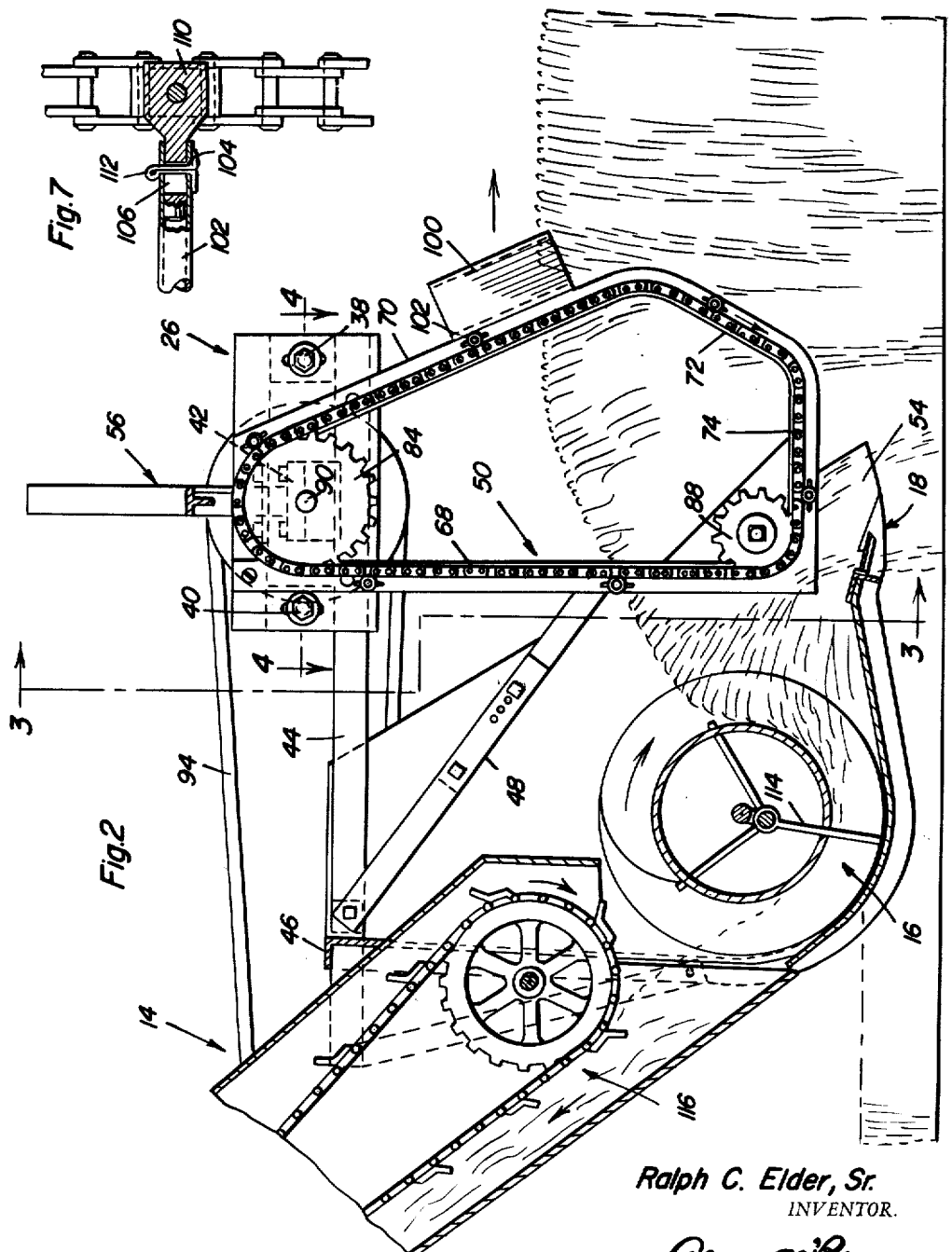

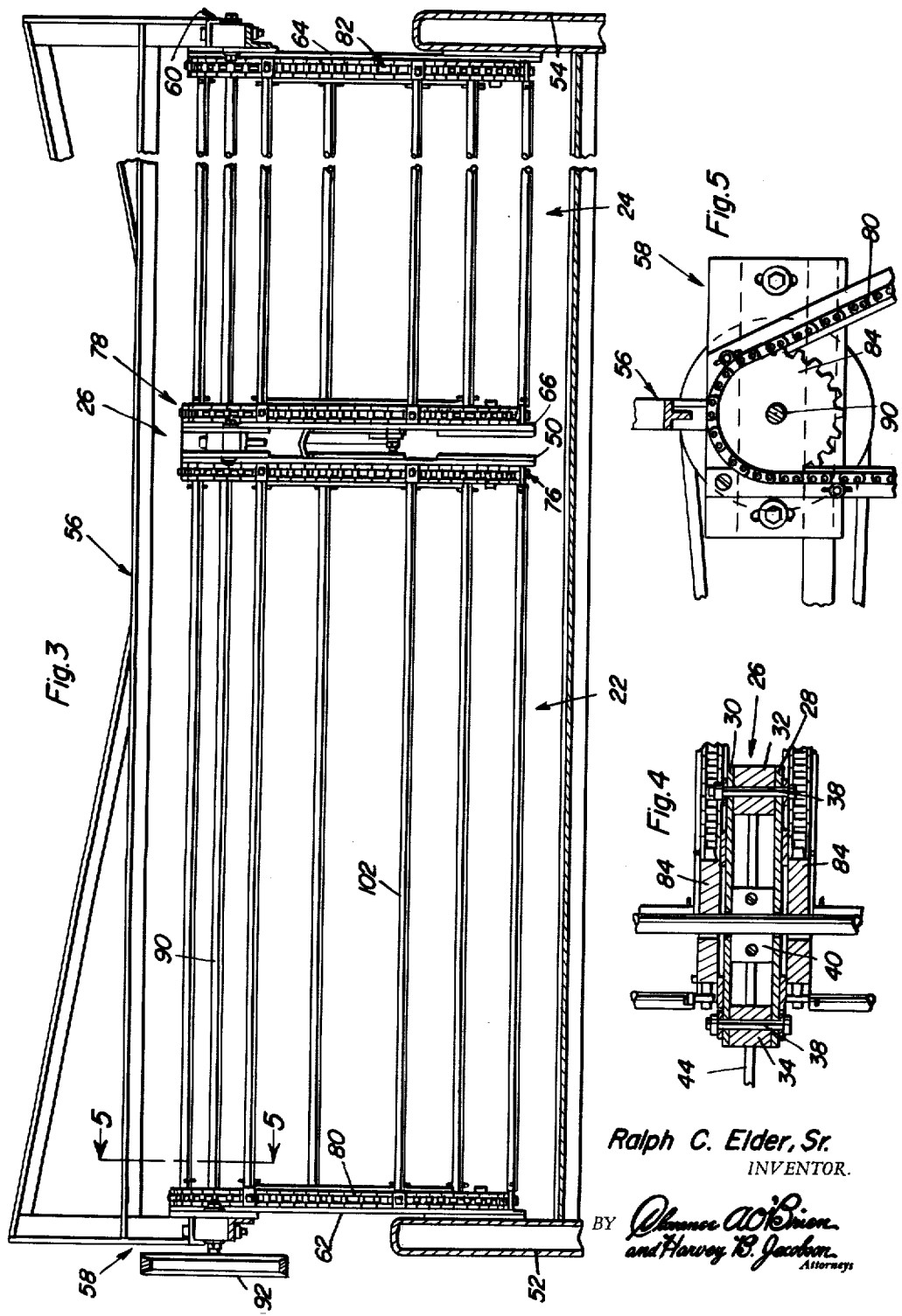

United States Patent Office 3,077,719
Patented Feb. 19, 1963

3,077,719
CHAIN AND SLAT TYPE REEL FOR COMBINES
Ralph C. Elder, Sr., Pendleton, Oreg., assignor of one-half to Ralph C. Elder, Jr., Pendleton, Oreg.
Filed Aug. 23, 1960, Ser. No. 51,381
10 Claims. (Cl. 56—219)

This invention relates to reel mechanisms connected to the header portion of a harvesting machine for conditioning the grain stalks prior to cutting thereof by the sickle bar and laying the cut grain stalks into the feed conveyor of the header.

It is therefore a primary object of this invention to provide a reel mechanism which is of such novel construction as to perform its function with greater efficiency and flexibility.

Another object of this invention is to provide a reel mechanism for a harvesting machine which operates in a more satisfactory manner than reel arrangements heretofore used to avoid loss of grain from the grain stalks engaged by the reel slats.

An additional object of this invention is to provide a reel mechanism for a harvesting machine including slats so arranged that the reel mechanism will continue to operate in a satisfactory manner despite bending of the reel slats.

The reel mechanism made in accordance with this invention therefore includes two reel sections mounted on a frame connected forwardly of the header of the harvesting machine which frame includes a center supporting section which mounts forwardly of the reel sections a divider extending between the adjacent inner ends of the reel sections so as to deflect the grain stalks onto the reel sections. Accordingly, the reel mechanism so divided into two sections has greater flexibility and permits greater maneuverability through the grain stalks by the harvesting machine. Also, the reel sections are made up of a pair of endless chain belts which belts are interconnected by tubular slats. The slats are interconnected with aligned links on the endless chain belts by means of pin and slot connections accommodating thereby deformation for limited axial displacement of the slats with respect to the chain link connections so that the reel sections may continue to operate in a satisfactory manner after some of the slats may perchance become bent.

A further feature of the invention resides in the shape of the forward run of the endless chain belt carrying the slats therebetween so that the forward run includes an upper section forwardly inclined causing the slats to engage the grain stalks at a forward angle thereto preventing slapping of the grain stalks and loss of grain thereby as is characteristic of previous reel mechanisms. The direction of the chain belt subsequently changes to a rearward direction to thereby gather the grain stalks up against the sickle bar for cutting thereof and laying of the cut stalks into the auger feed mechanism which delivers the stalks to the centrally disposed portion of the harvester header from which the cut grain stalks are fed into a raddle conveyor by means of the centrally disposed retractible feeder fingers on the auger mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the forward portion of a harvesting machine embodying the novel reel arrangement of the invention.

FIGURE 2 is an enlarged sectional view taken through a plane indicated by section line 2—2 in FIGURE 1.

FIGURE 3 is an enlarged sectional view taken through a plane substantially indicated by section line 3—3 in FIGURE 2.

FIGURE 4 is an enlarged sectional view taken through a plane indicated by section line 4—4 in FIGURE 2.

FIGURE 5 is an enlarged sectional view taken through a plane indicated by section line 5—5 in FIGURE 3.

FIGURE 6 is an enlarged partial perspective view of the chain link and slat connection in disassembled condition.

FIGURE 7 is a partial sectional view of the pin and slot connection between a reel slat and chain link.

Referring now to the accompanying drawings, FIGURE 1 illustrates the forward portion of a harvester combine generally indicated by the reference numeral 10 which includes the combine operator portion 12 and the header portion 14 of a conventional type of harvesting machine. It will also be observed in FIGURE 1, that an auger feed mechanism 16 is provided which auger mechanism is of a conventional type disposed rearwardly of a sickle cutter mechanism 18 also of a type presently commercially marketed. The novelty of this invention therefore resides in the reel mechanism and its mounting generally indicated by reference numeral 20 which includes two sections 22 and 24.

Referring to FIGURES 1, 2 and 3 it will be observed that a frame assembly mounts the reel sections 22 and 24 as well as the sickle bar mechanism 18 and the auger feed mechanism 16. The frame assembly therefore includes a central supporting section by means of which the frame assembly is attached to the header portion 14 of the harvesting machine. The central frame portion generally indicated by the reference numeral 26 as seen in FIGURE 2, includes a pair of central mounting plates 28 and 30 which are spaced apart by end blocks 32 and 34 as more clearly seen in FIGURE 4. Bolt members 36 and 38 accordingly hold the plates 28 and 30 and blocks 32 and 34 in assembled condition. Also, a bearing block 40 is disposed between the plates 28 and 30 to which a clamp block 42 is secured. Connected to the bottom of the block between the plates 28 and 30 is a frame member 44 which extends rearwardly from the central frame portion 26 and is connected at its rear end to an angle frame member 46. The member 44 is braced by a brace member 48 which is connected to the member 44 adjacent to the cross angle frame member 46 at one end and at its other end is connected to a track frame 50.

It will be observed in FIGURES 1 and 3, that the cross angle frame member 46 extends transversely across the harvester machine 10 and is connected at its central portion to the header portion 14 of the harvesting machine as more clearly seen in FIGURE 2. At the outer ends of the cross frame member 46 side frame members 52 and 54 are connected the lower portions of which rotatably mount the auger feed mechanism 16 and the sickle bar mechanism 18 in a conventional manner as more specifically illustrated in FIGURE 2. The frame assembly also includes a top frame assembly generally indicated by the reference numeral 56 which interconnects side frame assemblies 58 and 60 each of which side frame assemblies are similar in construction to each other and to the central assembly 26, the side frame assembly 58 being shown more specifically in FIGURE 5. The top frame assembly 56 is therefore of a reinforced truss construction as more clearly seen in FIGURE 3 for rigidly interconnecting said frame members 52 and 54 thereby maintaining in spaced relation the side frame assemblies 58 and 60. It will therefore be observed that the side frame assemblies 58 and 60 support endless chain belt track members 62 and 64 which are similar in construction to each other and similar in construction to the chain belt track members 50 and 66 which latter two track members are respectively supported by the side plates 28 and 30 of the central frame assembly 26. Referring therefore to FIGURE 2 again it will be observed that each of the track frame members include a vertically disposed run and a forwardly disposed run having an upper section inclined forwardly in the direction of movement of the harvester machine and a lower section inclined rearwardly and downwardly at an obtuse angle to the upper section. The rear vertically disposed run is designated by the reference numeral 68 while the upper section of the forward run is designated by the reference numeral 70 and the lower section by reference numeral 72, the lower section being connected to the rearward run 68 by means of a horizontal portion 74.

Each track frame member 50, 66, 62 and 64 therefore guidingly mounts an endless chain belt generally indicated by the reference numerals 76, 78, 80 and 82 as more clearly seen in FIGURE 3. Each of the belts is therefore trained about an upper drive sprocket wheel 84 and a lower idler sprocket wheel 88 with the idler sprocket wheel 88 being rotatably mounted by the track frame while the drive sprocket wheels 84 are fixed to a sprocket drive shaft 90 which is common to all of the sprocket wheels for simultaneous drive thereof. The sprocket drive shaft 90 is therefore journaled within the bearing blocks of each of the central frame assemblies 26 and side frame assemblies 58 and 60.

Connected to the sprocket drive shaft 90 on one side of the reel section 22 is a drive pulley 92 which is belt connected by belt 94 to a power take-off pulley 96 located at the side of the combine 10 as seen in FIGURE 1. As also seen in FIGURE 1 a second power take-off pulley 98 is provided and is belt connected to the sickle bar mechanism 18 and auger feed mechanism 16 in a conventional manner.

Referring to FIGURES 1, 2 and 3 once again, it will be observed that the centrally disposed track frame members 50 and 66 have connected thereto a grain stalk divider device 100 which extends just above the connection of the upper section 70 of the track members to the lower section 72, the divider 100 also transversely extending beyond the closely spaced belt mechanisms 76 and 78 supported by the track members as more clearly seen in FIGURE 1. It will now be observed that the belt mechanisms 76 and 80 constitute part of the reel section 24 while the belt mechanisms 78 and 82 constitute part of the reel section 22. Accordingly, the two pairs of belt mechanisms are interconnected by a plurality of tubular slat members 102. Referring therefore to FIGURES 6 and 7 in particular, the connections of the tubular slat members 102 to the belt mechanisms will be illustrated. The ends of the slat members 102 therefore include apertures 104 which are aligned within a slot 106 formed in a stub shaft 108 over which the ends of the slat members 102 extend in assembled position as more clearly seen in FIGURE 7. The stub shafts 108 are connected to a connecting portion 110 which is secured to a link of the endless chain belt of each belt mechanism. Accordingly, it will be seen that each of the slat members 102 are interconnected with aligned links on the pair of belt mechanisms making up the reel sections 22 and 24 and are connected to the belt mechanisms in such a way that a certain amount of axial displacement or lost motion between the ends of the slat members 102 and the stub shafts 108 is possible. Accordingly, cotter pins 112 are provided for making the axially limited interconnection. As a result of such interconnection, bending of the slat members 102 may occur without pulling on the chain and without disconnection of the slat member therefrom so that the reel sections may continue to operate without disruption.

From the foregoing description, operation and use of the reel mechanism and harvesting machine will be apparent. Briefly summarizing therefore, with reference to FIGURE 2 it may be observed that the combine will move forwardly in the direction of the arrow so that the grain stalks divided by the divider 100 will be engaged on either side of the divider 100 by each of the reel sections 22 and 24. The centrally mounted chains 76 and 78 may therefore provide the more closely spaced support for the two reel sections having a combined swath greater than what would be practicable with only one reel section and further providing greater flexibility because of the separately spaced mounting of the slats. Each of the reel sections therefore includes a pair of moving belt mechanisms interconnected by the slats 102 said belt mechanisms being driven by the drive pulley 84 drivingly connected to the power take-off 96 by means of belt 94 disposed on one outer side of the reel sections avoiding thereby the wider central separation necessary to accommodate a centrally disposed drive. The slats 102 therefore move downwardly on the forward run of the belt mechanisms and near the lower end of the section 70 of the supporting track member will engage the grain stalks at a slight forward angle thereto so as to avoid slapping thereof. The slat member 102 subsequently moves on to the lower section 72 of the supporting track member and accordingly bends the grain stalks gradually rearwardly into the sickle bar mechanism 18 for cutting thereof because of the obtuse angular relationship between the upper and lower sections 70 and 72. The slat member 102 subsequently moving along the horizontal portion 74 of the track frame member lays the cut grain into the auger feed mechanism 16. The cut grain is therefore moved by the auger mechanism 16 inwardly toward the central portion thereof whereby retractable feed fingers 114 push the cut grain stalks into a conveyor mechanism 116 located within the head 14 as seen in FIGURE 2.

Accordingly, from the foregoing it will be appreciated that the reel mechanism of this invention is characterized by the novel separation section arrangement rendering the reel mechanism more flexible and enabling greater maneuverability for the combine through the grain stalks. Also, the novel manner in which the slat members are connected to the pairs of belt mechanisms making up each of the reel sections permits the more efficiently shaped belt mechanism to continue operation despite any bending of the slats.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a harvester machine including a transversely disposed sickle bar and auger feed mechanism for directing cut grain stalks into a centrally disposed header, the combination with a reel mechanism comprising, frame means connected to the header rearwardly of said sickle bar and auger mechanism and thereabove, a plurality of pairs of transversely spaced endless chain belt mechanisms drivingly mounted on said frame means forwardly of the auger feed mechanism and above the sickle bar, a drive shaft therefor, portions of said spaced endless chain belt mechanisms extending in depending relation to said drive shaft, and a plurality of reel slat means adjustably interconnecting each pair of chain belt mechanisms and carried thereby and stalk divider means fixedly mounted on said frame means forwardly of and extending between and in overlapping relation to adjacent chain belt mechanisms of said pairs of chain belt mechanisms.

2. The combination as defined in claim 1, wherein each reel slat means includes lost motion connecting means for connecting each end of each slat means to aligned chain belt links on each pair of chain belt mechanisms permitting bending of any slat means without disrupting operation of the reel mechanism.

3. The combination as defined in claim 2, wherein each slat member comprises a tubular slat member having apertures adjacent opposite ends thereof and each lost motion connecting means comprises a stub shaft attached to a chain belt link and having an axial slot therein for receiving a cotter pin extending through said apertures of said tubular slat member surrounding the stub shaft and the slot in the stub shaft.

4. The combination as defined in claim 3, wherein said frame means includes a plurality of transversely spaced continuously rigid track members for guiding each chain belt mechanism.

5. The combination as defined in claim 4, wherein each chain belt mechanism includes a downwardly moving forward section having a forwardly inclined upper section connected to a rearwardly inclined lower section disposed at an obtuse angle to the upper section whereby each slat means may gently engage grain stalks and subsequently bend the stalks to condition them for cutting by the sickle bar and reception by the auger mechanism.

6. The combination as defined in claim 1, wherein each chain belt mechanism includes a downwardly moving forward section having a forwardly inclined upper section connected to a rearwardly inclined lower section disposed at an obtuse angle to the upper section whereby each slat means may gently engage grain stalks and subsequently bend the stalks to condition them for cutting by the sickle bar and reception by the auger mechanism.

7. The combination of claim 1, wherein said frame means includes a plurality of transversely spaced continuously rigid track members for guiding each chain belt mechanism.

8. A reel mechanism for a harvester machine comprising, a plurality of drivingly interconnected reel sections rotatably mounted on a frame means, a drive shaft therefor, portions of said reel sections extending in depending relation to said drive shaft, grain divider means mounted on said frame means and extending between and in overlapping relation to said reel sections, and guide means mounted on said frame means for directing each reel section against grain stalks initially in a forward direction and subsequently in a downward rearward direction to thereby avoid slapping of the grain stalk and loss of grain therefrom.

9. The mechanism as defined in claim 8, wherein each reel section comprises a pair of endless chain belts interconnected by a plurality of tubular slat means.

10. The mechanism as defined in claim 9, wherein each slat means includes lost motion connections between opposite ends of each slat means and aligned chain belt links on each pair of endless chain belts.

References Cited in the file of this patent

UNITED STATES PATENTS

| | | |
|---|---|---|
| 2,329,596 | Dalimata | Sept. 14, 1943 |
| 2,515,343 | Gravely | July 18, 1950 |
| 2,529,180 | Oehler | Nov. 7, 1950 |
| 2,724,942 | Smith | Nov. 29, 1955 |